(12) United States Patent
Wilson et al.

(10) Patent No.: US 9,881,637 B1
(45) Date of Patent: Jan. 30, 2018

(54) METHODS AND DEVICES FOR SPIN TORQUE OSCILLATOR CONTROL AND MONITORING

(71) Applicant: AVAGO TECHNOLOGIES GENERAL IP (SINGAPORE) PTE. LTD., Singapore (SG)

(72) Inventors: Ross Wilson, Menlo Park, CA (US); Andrew Krebs, Eagan, MN (US); Jaydip Bhaumik, Longmont, CO (US); Greg Starr, Longmont, CO (US); Scott O'Brien, Mendota Heights, MS (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/435,527

(22) Filed: Feb. 17, 2017

(51) Int. Cl.
*G11B 5/02* (2006.01)
*G11B 5/00* (2006.01)

(52) U.S. Cl.
CPC ........ *G11B 5/02* (2013.01); *G11B 2005/0024* (2013.01)

(58) Field of Classification Search
CPC .... G11B 2005/0021; G11B 2005/0005; G11B 5/314; G11B 5/012; G11B 5/00; G11B 5/4907; G11B 5/2452; G11B 11/10543; G11B 11/10532

USPC .......... 360/31, 55, 59, 313, 328; 369/13.13, 369/13.32, 13.33
See application file for complete search history.

(56) References Cited

U.S. PATENT DOCUMENTS

| | | | |
|---|---|---|---|
| 8,094,399 B2 * | 1/2012 | Roppongi | G11B 5/1278 360/55 |
| 8,917,465 B1 | 12/2014 | Contreras et al. | |
| 8,982,502 B2 | 3/2015 | Morinaga et al. | |
| 9,001,444 B1 * | 4/2015 | Contreras | G11B 5/127 360/31 |
| 9,007,723 B1 | 4/2015 | Igarashi et al. | |
| 2009/0059417 A1 | 3/2009 | Takeo et al. | |

* cited by examiner

*Primary Examiner* — Nabil Hindi
(74) *Attorney, Agent, or Firm* — Sheridan Ross P.C.

(57) ABSTRACT

An apparatus for microwave-assisted magnetic recording includes a magnetic write head operable to write data to a magnetic storage medium. The apparatus includes a spin-torque microwave oscillator coupled to the magnetic write head and operable to provide microwave radiation to the magnetic storage medium. The apparatus includes a driver circuit in communication with the magnetic write head. The driver circuit is operable to dynamically modulate bias current provided to the spin-torque microwave oscillator in sympathy with data being written to the magnetic storage medium by the magnetic write head.

20 Claims, 14 Drawing Sheets

METHODS AND DEVICES FOR SPIN TORQUE OSCILLATOR CONTROL AND MONITORING

FIELD OF THE DISCLOSURE

The present disclosure is generally directed toward methods and devices for spin-torque oscillator (STO) control and monitoring.

BACKGROUND

High capacity hard disk drives (HDDs) and other magnetic storage devices employ thermally stable fine-grained high coercivity media. The high coercivity media requires write fields in excess of those attainable with current write heads, the performance of which are limited by pole tip saturation and material properties. Energy-assisted magnetic recording techniques overcome the coercivity/write-field conflict. In heat-assisted recording (HAMR), the temperature of the medium in the write zone is elevated to near the Curie point, typically by a laser, easing magnetization by an achievable write field. An alternative method is microwave-assisted magnetic recording (MAMR), in which near-field microwave radiation excites the recording medium at its ferromagnetic resonance frequency, permitting magnetic moment polarity-switching with reduced write fields. The frequency of the near-field microwave radiation is in the 10 GHz-60 GHz range and is provided by a nanometer-sized spin-torque oscillator (STO) fabricated in the write head gap.

However, STO behavior is adversely affected by the cyclically-reversing write-gap field, and as such, it is desired to control the STO current so as to improve the MAMR write process. It is also desired to measure and/or to align the STO frequency to the ferromagnetic frequency of the recording medium. Knowledge of STO frequency is desired in 3-D recording schemes in which a multilayer recording medium employs layer-specific ferromagnetic frequencies to select layer access. Still further, it is desired to determine whether the STO is oscillating in a stable manner because instability can be caused by fields emanating from prior-recorded information.

BRIEF DESCRIPTION OF THE DRAWINGS

The present disclosure is described in conjunction with the appended figures, which are not necessarily drawn to scale.

DETAILED DESCRIPTION

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

It should also be appreciated that example embodiments described herein may be implemented in any number of form factors. Specifically, the entirety of the circuits disclosed herein may be implemented in silicon as a fully-integrated solution (e.g., as a single Integrated Circuit (IC) chip or multiple IC chips) or they may be implemented as discrete components connected to a Printed Circuit Board (PCB).

Figure 1:
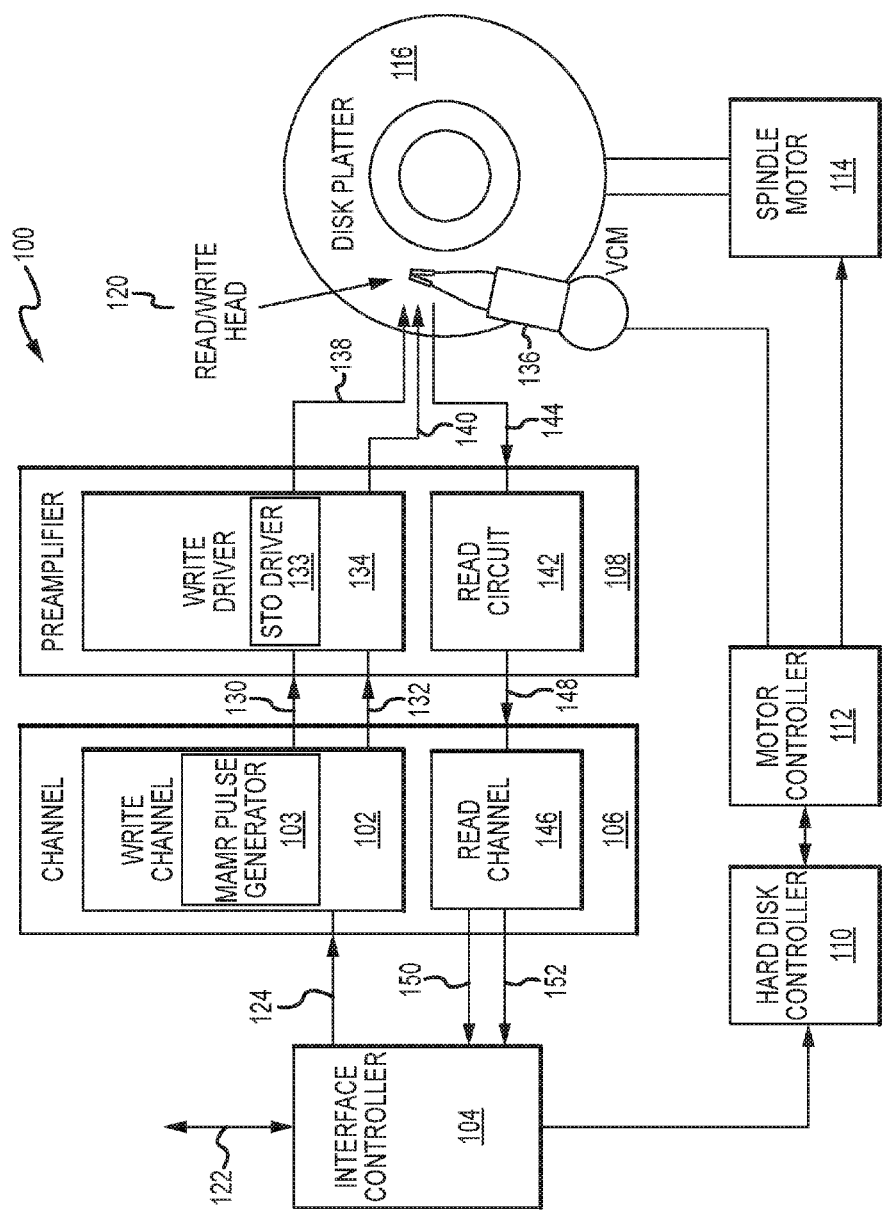
FIG. 1 illustrates a magnetic storage system according to an example embodiment.

Turning to FIG. 1, a magnetic storage system 100 is depicted including a write channel 102 that includes a triggerable MAMR pulse generator 103 in accordance with some embodiments. Storage system 100 may be, for example, a hard disk drive. Storage system 100 includes an interface controller 104, channel circuit 106, preamplifier 108, a hard disk controller 110, a motor controller 112, a spindle motor 114, a disk platter 116, and a read/write head assembly 120. Interface controller 104 controls addressing and timing of data to/from disk platter 116. The interface controller 104 may include devices such as a processor, buffer memory, format control, error correction circuits, and interface circuits. The data on disk platter 116 consists of groups of magnetic signals that may be written and detected by read/write head assembly 120 when the assembly is properly positioned over disk platter 116. In one embodiment, disk platter 116 includes magnetic signals recorded in accordance with either a longitudinal or a perpendicular recording scheme.

During a write operation, interface controller 104 receives digital data 122 to be stored on the disk platter 116 and provides corresponding digital write data 124 to the write channel 102 in the channel circuit 106. The digital data 122 may be received in serial form on a standardized device interface such as a Serial Advanced Technology Attachment (SATA) interface. During write operations, the digital data 122 is stored in a local buffer memory, formatted and augmented with error correction codes.

Write channel 102 may process the digital write data 124 in a number of ways, such as serializing the data, modulation coding the data and adding parity bits, serializing the data at the desired bit-rate, and performing magnetic write precompensation. The write channel 102 includes the MAMR pulse generator 103 that times the operation of the STO driver 133 and the STO 250 (see FIG. 2A). The write channel 102 provides encoded write data (or first control signal) 130 and a MAMR trigger pulse signal (or second control signal) 132 to a write driver 134 in preamplifier 108. In some embodiments, the preamplifier 108 is mounted on an actuator arm 136, and the encoded write data 130 and MAMR trigger pulse signal 132 are driven from the channel circuit 106 by transmitters and delivered over a flex-cable in differential positive emitter-coupled logic (PECL) format to the STO driver 133 in the arm-mounted preamplifier 108. The preamplifier 108 converts the encoded write data 130 to a high-current analog write signal, generates an STO control signal (or second driver signal) 140 based on the MAMR trigger pulse signal 132, and impresses in the read/write head assembly 120 a bipolar programmable write current (or first driver signal) 138 of polarity determined by that of the write data signal 130. Simultaneously, MAMR trigger pulse signal 132 causes generation of a STO control signal 140 which is impressed in the read/write head assembly 120. The MAMR pulse generator 103 and the STO driver 133 are discussed in more detail below with reference to FIGS. 2-9.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). A read circuit 142 in the preamplifier 108 establishes a bias current in the magneto-resistive read/write head assembly 120. Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal 144 representative of the magnetic data on disk platter 116. This minute analog signal 144 is transferred from read/write head assembly 120 to read circuit 142 in the preamplifier 106, where it is amplified and is conveyed to a read channel 146 in the channel circuit 106 as analog read data 148. In turn, read channel 146 decodes and digitizes the received analog signal to recreate the user data originally written to disk platter 116, as well as extracts servo information.

As part of processing the analog read data 148, read channel circuit 146 may perform one or more operations such as analog filtering, variable gain amplification, analog to digital conversion, equalization, timing recovery, data detection, decoding, deserialization, and servo demodulation to obtain the user data and servo information. The user data is provided by read channel 146 as digital read data 150 to the interface controller 104, where it is error-corrected, stripped of special formatting fields, and reassembled in buffer memory for transmission to a user device as digital data 122. The read channel 146 also provides the servo data 152 to the interface controller 104 for use in driving the hard disk controller 110 and motor controller 112. During both the read and write operations, microcode in the interface controller 104 controls spindle speed and regulates head position to maintain accurate track-following and to seek between tracks. Servo position information for these functions is demodulated by the read channel 146 from dedicated fields prerecorded on the disk platter 116 at intervals between data records. FIG. 1 shows the read/write head assembly 120 as including three elements: a writer (inductor), a reader (resistor), and an STO 250. However, it should be understood that additional elements may be included such as a fly-height sensor and/or heater.

It should be noted that storage system 100 may be integrated into a larger storage system such as, for example, a RAID (redundant array of inexpensive disks or redundant array of independent disks) based storage system.

It should also be noted that various functions or blocks of storage system 100 may be implemented in either software or firmware, while other functions or blocks are implemented in hardware. The various blocks disclosed herein may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

Figure 2A:
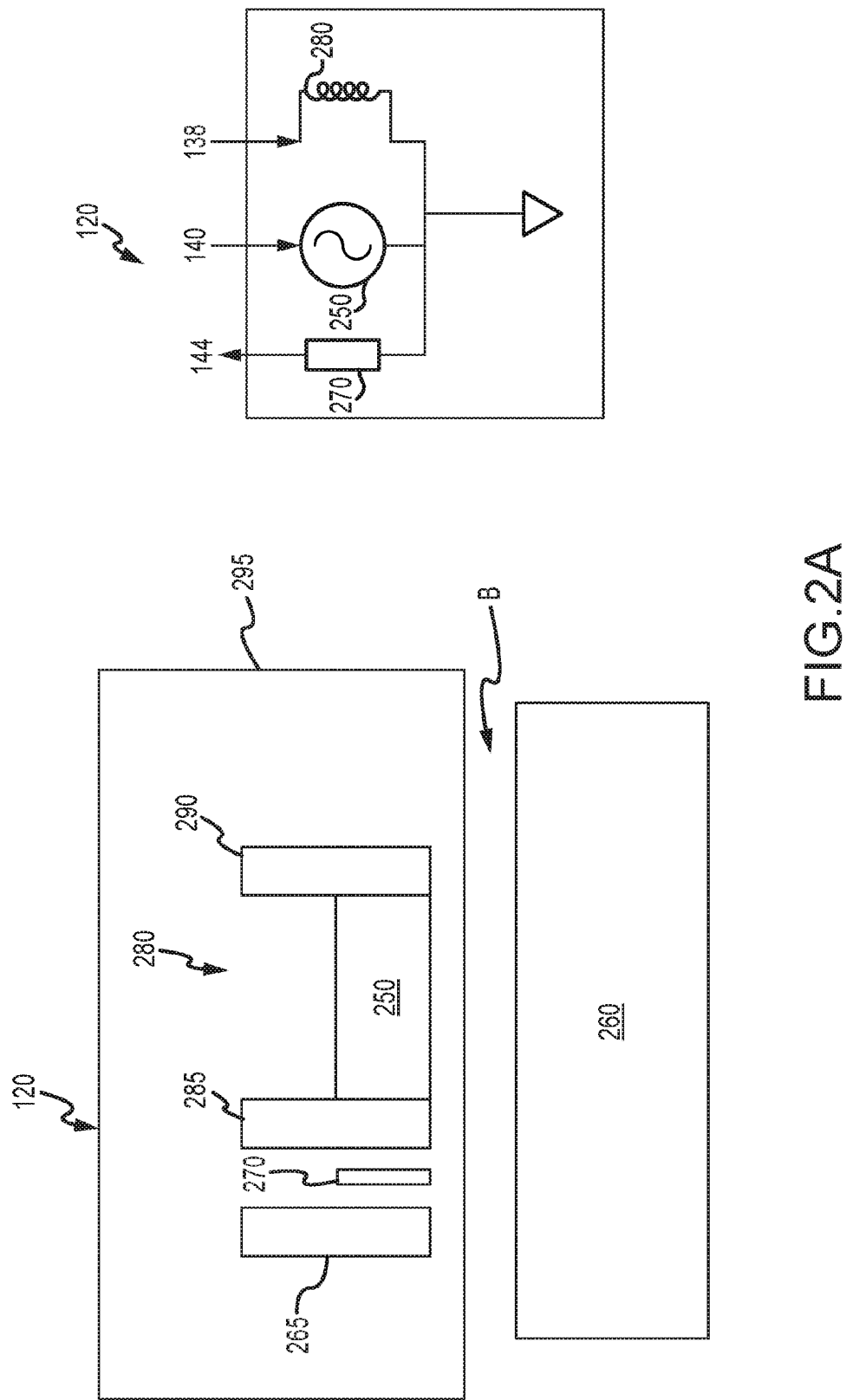
FIG. 2A illustrates the read/write head assembly of FIG. 1 according to at least one example embodiment.

FIG. 2A illustrates the read/write head assembly 120 of FIG. 1. FIG. 2A illustrates the read/write head assembly 120, which is fabricated on a substrate 295 (e.g., alumina substrate) and spaced apart from a recording medium 260 by an air-bearing at a distance B of, for example, about 2.5 nm. The read/write head assembly 120 includes a shield 265 and a reader (or read head) 270. The reader 270 is for reading data from the recording medium 260 while the shield 265 shields the reader 270 from internal and/or external interference. The read/write head assembly 120 further includes a writer (or write head) 280. The writer 280 includes shields 285 and 290 as well as a spin-torque oscillator (STO or spin-torque microwave oscillator) 250 coupled between the shields 285 and 290. The STO 250 permits MAMR, and is discussed below in more detail with reference to FIG. 2B. Although not explicitly shown it should be understood that the write head 280 may include windings to allow for magnetic writing of write data. For clarity, FIG. 2A also illustrates an equivalent circuit of the read/write head assembly 120 in relation to the signals 138, 140, and 144 in FIG. 1, where reader 270 is illustrated as a resistance, STO 250 is illustrated as an oscillator, and writer 280 is illustrated as an inductance.

Figure 2B:
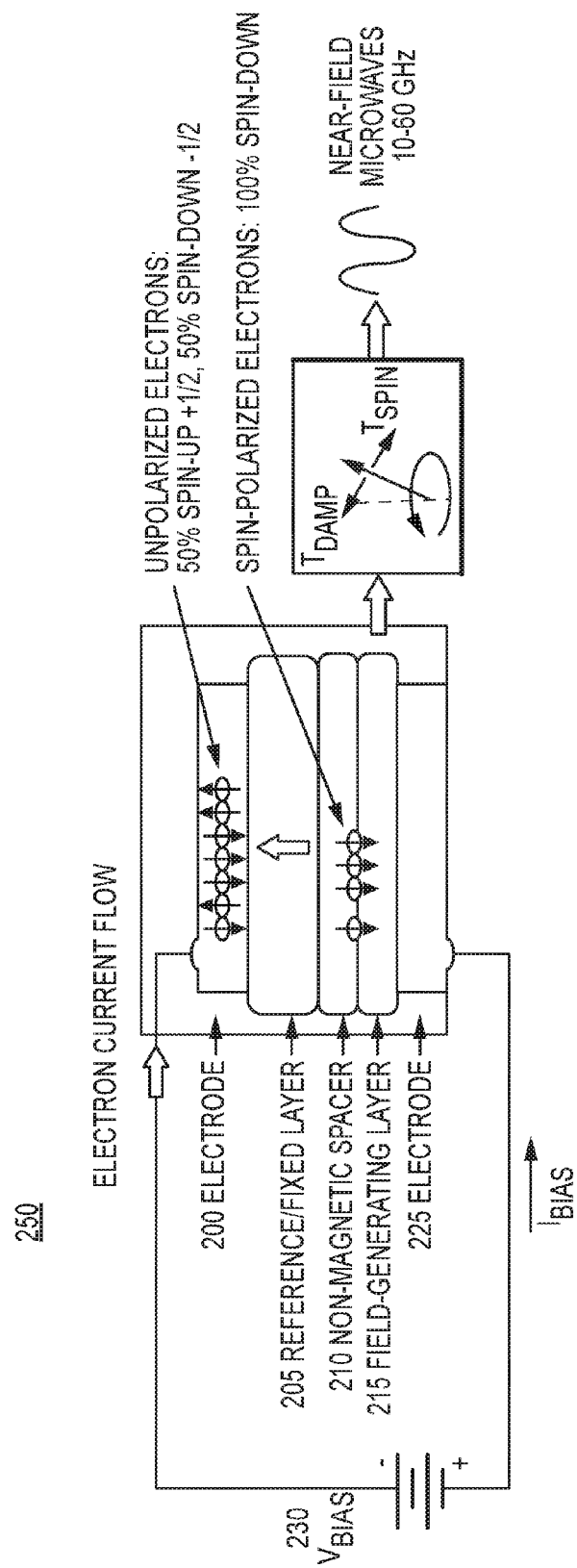
FIG. 2B illustrates a spin torque oscillator (STO) of the read/write head assembly in FIG. 2A according to an example embodiment.

FIG. 2B illustrates a spin torque oscillator (STO) 250 of the read/write head assembly 120 in FIG. 2A according to an example embodiment. As shown in FIG. 2B, the STO 250 includes an electrode (or first electrode) 200, a fixed layer (or reference layer or spin-polarizing layer) 205, a spacer 210, a field layer (or field generating layer or free layer) 215, an electrode (or second electrode 225), and a voltage source 230 providing a bias voltage Vbias and a bias current Ibias. The electrodes 200 and 225 may be comprised of metal and/or other suitable conductive material. The fixed layer 205 includes a magnetic material and has a fixed (or invariable) magnetization direction (such as a perpendicular magnetization as indicated by the arrow in FIG. 2). The spacer 210 includes a non-magnetic and electrically conductive material, such as Cu, Ag, and/or alloys thereof. Field layer 215 includes a magnetic material whose magnetization direction is variable based on an applied field (e.g., an applied magnetic field). The fixed layer 205 and the field layer 215 may include, for example, magnetic alloys such as NiFe or CoFe.

In operation, randomly polarized up/down spin electrons from the (programmable) bias current Ibias are injected at the first electrode 200, then flow down through the fixed layer 205 which acts as a spin-direction filter and passes spin-down (or spin-up) electrons. Note that the electron flow is opposite to conventional positive-to-negative current flow terminology. Either the first electrode 200 or the second electrode 225 may be bonded electrically to one of the write-head pole-pieces of the write head assembly 120. After passing through the non-magnetic spacer 210, the spin-polarized electrons transfer spin torque to the field layer 215, where a countervailing damping torque causes the electron magnetic moments to precess at a microwave frequency. The free layer 215 emits near-field microwave radiation which impinges on recording medium 260 to ease recording of data. It should be understood that the first and second electrodes 200 and 225 may be separate from or integrated into shields 285 and 290 in FIG. 2A. If the first and second electrodes 200 and 225 are integrated the shields 285 and 290, an insulating spacer is provided on one end of the STO 250 to mitigate the shields 285 and 290 from short-circuiting the STO 250.

Figure 3:
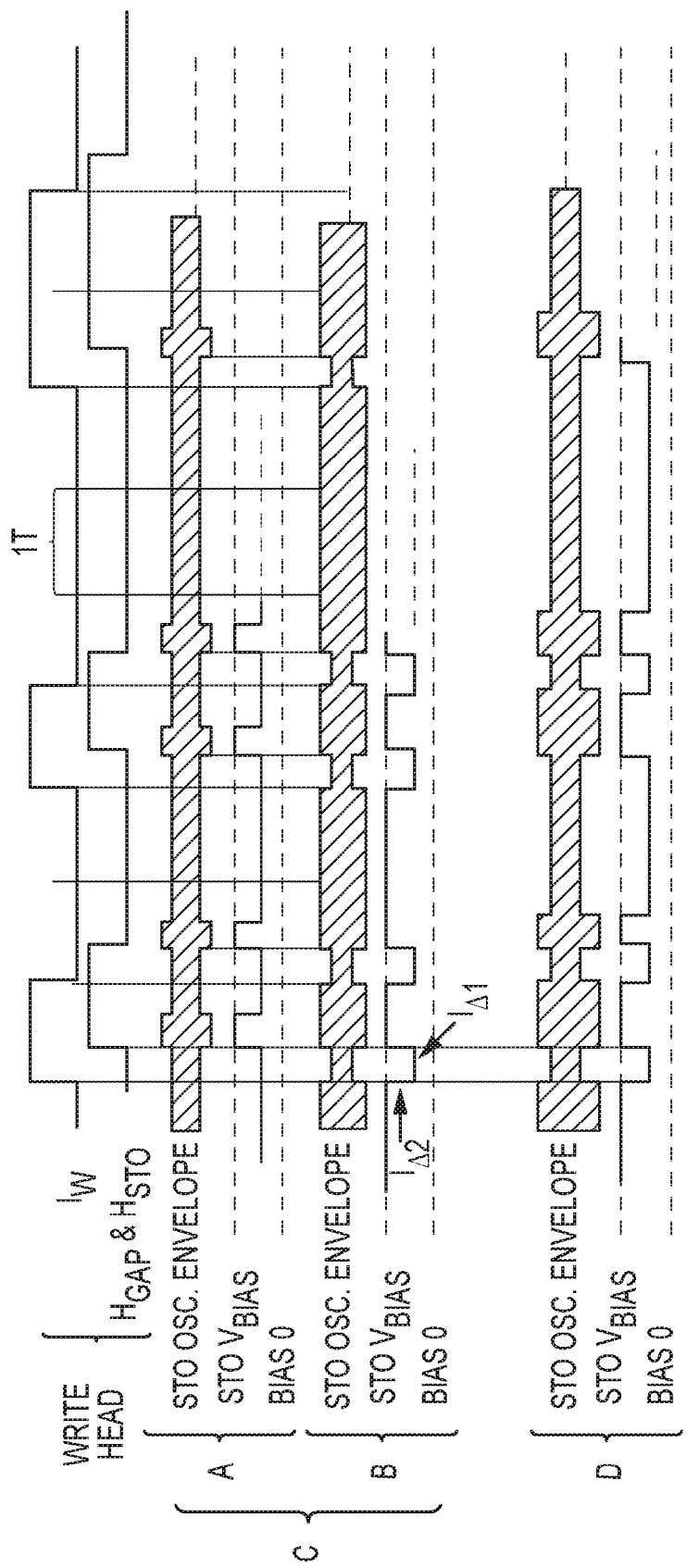
FIG. 3 illustrates example modes and timing diagrams for controlling the STO of FIG. 2B according to at least one example embodiment.

The frequency of the STO 250 is influenced by bias current Ibias and by the write-gap field, in which the STO 250 is immersed. However, the behavior of the STO 250 is adversely affected by the cyclically-reversing write-gap field, and it would be beneficial to control the STO 250 in such a fashion so as to improve the MAMR write process by assuring a minimum microwave amplitude and assuring that the microwave frequency is stable during transitions of the write data WD. FIG. 3 illustrates such control in more detail, as discussed below.

In view of FIGS. 1-2B, it may be said that the magnetic storage system 100 includes a magnetic write head 280 operable to write data WD to a magnetic storage medium 260. A spin-torque microwave oscillator 250 is coupled to the magnetic write head 280 and operable to provide microwave radiation to the magnetic storage medium 260. A driver circuit (STO driver) 133 is in communication with the magnetic write head, and the driver circuit 133 is operable to dynamically modulate bias current Ibias provided to the spin-torque microwave oscillator 250 in sympathy with data WD being written to the magnetic storage medium 260 by the magnetic write head 280.

FIG. 3 illustrates example modes and timing diagrams for controlling the STO 250 of FIG. 2 according to at least one example embodiment. In particular, FIG. 3 shows four different modes A, B, C, and D for controlling Vbias/Ibias in FIG. 2B so as to improve the MAMR write process by reducing STO perturbation. Modes A, B, C, and D are shown with reference to a write current Iw applied to write head 280, which induces a write magnetic field (or write field) $H_{GAP}$ and an STO magnetic field $H_{STO}$ in the STO 250. As shown, there is a gap flux reversal delay of the write field $H_{GAP}$ and the STO field $H_{STO}$ relative to the write current Iw. As also shown, each of modes A, B, C, and D includes an oscillation envelope of the STO 250 (STO Osc. Envelope), which is a microwave field envelope that reflects amplitude variation as a function of Vbias/Ibias.

In mode A of FIG. 3, the STO 250 is controlled such that Vbias (or STO bias or signal 140) is momentarily elevated at each transition point of the write field $H_{GAP}$. In other words, Vbias is pulsed high for a short time at each transition point of the write field $H_{GAP}$. This may be accomplished by delaying the write data WD and from both edges of the delayed write data WD, triggering a programmable-duration pulse generator so that Vbias is pulsed substantially at the same time as when the write field $H_{GAP}$ transitions. The delay, duration, and amplitude of the pulse may be a programmable parameter set based on empirical evidence and/or user defined.

In mode B, the STO 250 is controlled such that Vbias is momentarily reduced in anticipation of the transition of the write field write field $H_{GAP}$. In other words, Vbias is pulsed low for a short time just prior to each transition point of the write field $H_{GAP}$. This may be accomplished by triggering a programmable-duration pulse generator from both edges of the write data WD so that Vbias is pulsed low at each transition of the write current Iw.

Mode C is a combination of Modes A and B, where the STO 250 is controlled such that Vbias is momentarily elevated at each transition point of the write field $H_{GAP}$, and Vbias is momentarily reduced in anticipation of the transition of the write field write field $H_{GAP}$.

In mode D, the STO 250 is controlled such that Vbias is lowered during long periods of no transitions in the write current. This may reduce the average power consumption of the STO 250 and increase a lifespan of the STO 250.

It should be understood that the STO 250 may be controlled using various combinations of modes A, B, C, and D. In all modes A, B, C, and D, Vbias is assigned a base current level $I\Delta 1$, which is activated by a write gate during writing, and a pulse current level $I\Delta 2$, which is pulsed. The duration, sign, and amplitude of each Vbias pulse may be design parameters set based on empirical evidence and/or user defined values. In at least one embodiment, optimal parameter settings may be attained by iterative read/write operations with the goal of achieving a lowest bit error rate (BER) on central and adjacent tracks of the recording medium 260. As shown in FIG. 3, the duration each Vbias pulse is shorter than the pulse of the write current Iw and/or the write field $H_{GAP}$. However, example embodiments are not limited thereto, and the duration of each pulse may be adjusted as desired.

It should be understood that the timing diagrams of FIG. 3 may be implemented by the appropriate driver circuitry and/or software. Such circuitry is discussed in more detail below with reference to FIGS. 4A and 4B.

Figure 4A:
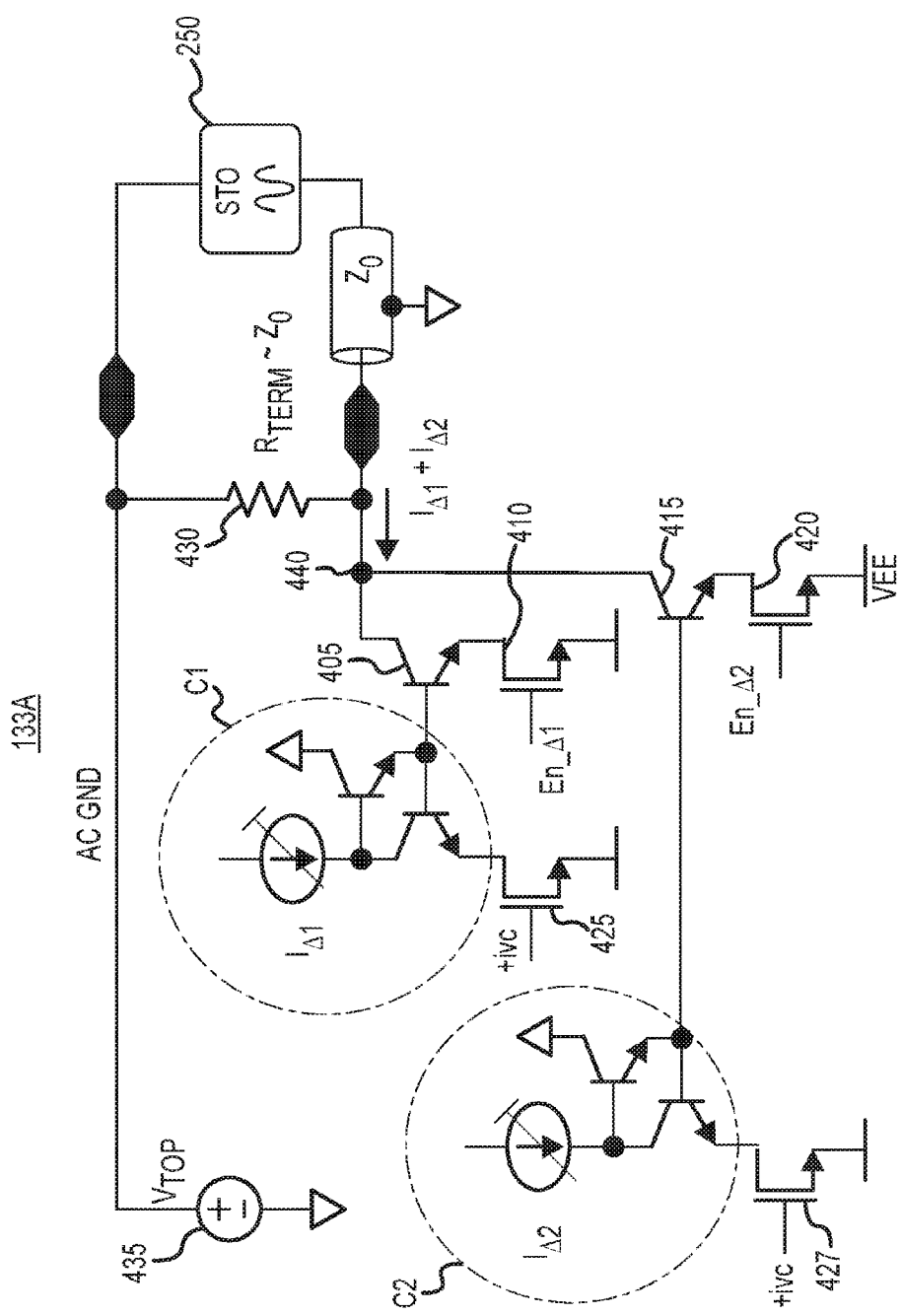
FIGS. 4A and 4B illustrate example circuits for driving the STO of FIG. 2B according to the timing diagrams in FIG. 3 according to at least one example embodiment.
Figure 4B:
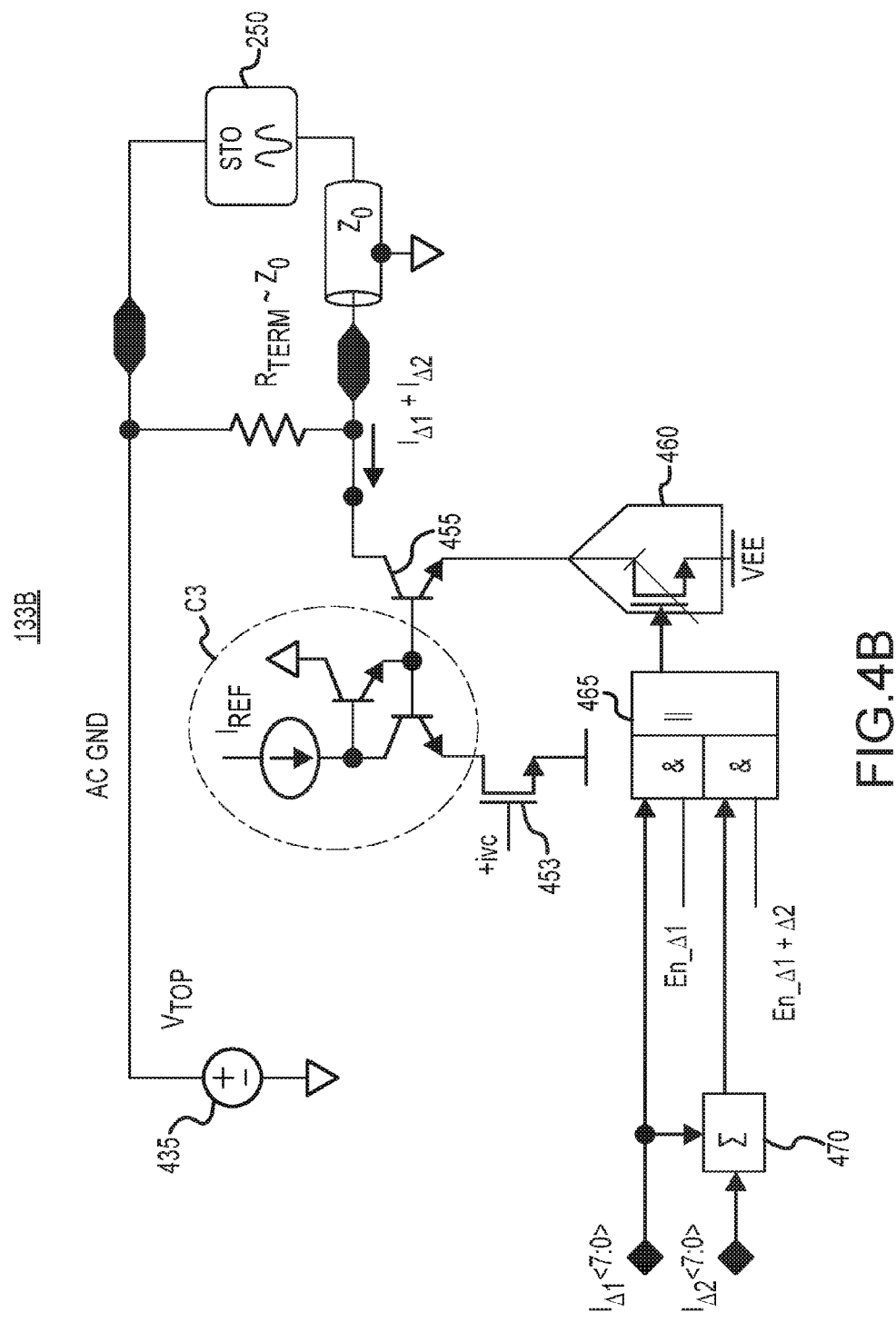

FIGS. 4A and 4B illustrate example circuits for driving the STO 250 according to the timing diagrams in FIG. 3. FIGS. 4A and 4B show different embodiments of the STO driver 133 in FIG. 1. FIG. 4A illustrates an STO driver (or driver circuit) 133A that includes individual current sources for generating currents $I_{A1}$ and $I_{A2}$. As shown in FIG. 4A, the STO driver 133A includes a first current mirror C1 for generating $I_{A1}$ and a second current mirror C2 for generating $I_{A2}$. Each current mirror C1 and C2 includes an associated amplifying transistor 405 and 415 to amplify outputs of the current mirrors C1 and C2 to a desired level, an associated enable transistor 410 and 420 (with respective enable signals En_$\Delta$1 and En_$\Delta$2) to enable selection of the currents $I_{A1}$ and $I_{A2}$, and dummy transistors 425 and 427 having gates tied permanently high by voltage +ivc in order to compensate for the ON resistances of the enable transistors 410 and 420 to improve mirror accuracy. The circuit 133A also includes a resistance $R_{TERM}$, which has a value selected to match the characteristic impedance Z0 of the transmission line to STO 250. The circuit 133A also includes a voltage source Vtop 435, which is used to bias a slider of the read/write head assembly 120 to electrostatically repel residue or dust on the recording medium 260. It should be understood that the voltage $V_{TOP}$ may be programmable variable of either polarity. Transistor type and/or STO polarities and common terminals can be reversed consistent with write head structure and circuit headroom requirements.

In FIG. 4A, individual switchable current sources are associated with currents $I_{A1}$ and $I_{A2}$. Current-source enabling is accomplished by an NMOS switch (i.e., transistors 410 and 420) in the emitters of the bi-polar junction transistor (BJT) current mirrors C1 and C2. Currents $I_{A1}$ and $I_{A2}$ are summed at an output node 440, before delivery to the STO 250.

FIG. 4B shows an example circuit that includes a single current source for generating currents $I_{A1}$ and $I_{A2}$. The circuit (or driver circuit or STO driver) 133B includes a current mirror C3 that generates a reference current Iref. Similar to FIG. 4A, the current mirror C3 has an associated dummy transistor 453 and an amplifying transistor 455. The circuit 133B further includes a high-speed digital-to-analog converter (DAC) 460 that receives an output from a high-speed AND-OR gate 465. The gate 465 selects between digital values (e.g., 8-bit values) for $I_{A1}$ and $I_{A1}+I_{A2}$ based on enable signals En_$\Delta$1 and En_$\Delta$2. The $I_{A1}+I_{A2}$ sum is computed by a digital adder 470. As shown, the adder 470 is positioned up-stream of the AND-OR gate to remove a carry-propagation delay from the path. The adder 470 may be implemented by firmware.

Implementation of the modes of FIG. 3 may be accomplished using the circuits of FIGS. 4A and 4B. That is, FIGS. 4A and 4B illustrate alternative bi-level pulse-mode drivers, where straightforward extension provides additional bias levels. The voltage across the STO 250 ($V_{STO}$) is given by, $$I_{\Delta 1} + I_{\Delta 2} = V_{STO} \cdot \frac{R_{TERM} + R_{STO}}{R_{TERM} R_{STO}},$$

where $R_{STO}$ is a resistance of the STO 250. Here, $R_{TERM} \sim Z_0$ to match the characteristic impedance of the transmission line feeding the STO 250, which reduces leakage of STO current. Other termination schemes include use of a switch termination applied at return-time of the line reflection or injection of a reflection-cancelling current. Typical STO resistances and bias voltage span of Vbias are in the range of 10Ω-80Ω and 100 mV-500 mV, respectively.

It should also be noted that various permutations of FIGS. 4A and 4B are possible. For example, in FIG. 4A, the two mirrors C1 and C2 could be provided constant reference currents, and the current amplitude to the STO 250 may be controlled by DACs in the output emitters of transistors 415 and 405. In FIG. 4B, the adder 470 could be eliminated if $I_{A1}$ and $I_{A1}+I_{A2}$ current demands are provided directly to the DAC 460.

Figure 5A:
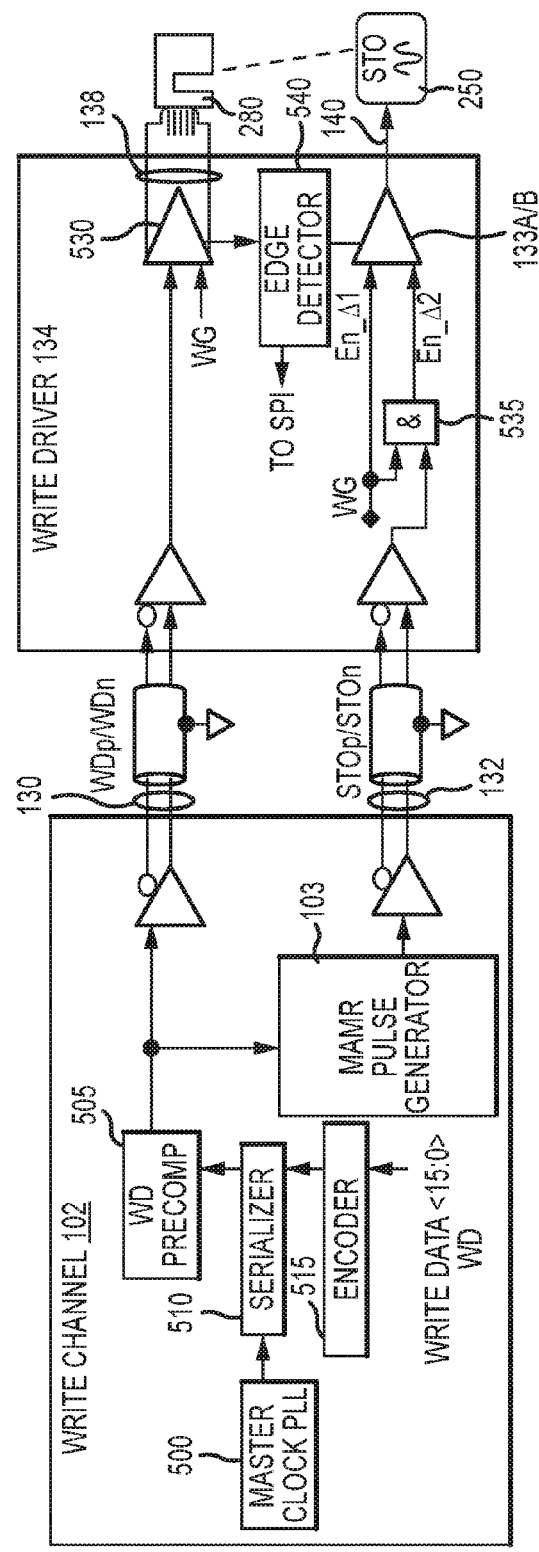
FIGS. 5A and 5B illustrates example structures of a write channel and a write driver from FIG. 1 for controlling the example circuits in FIGS. 4A and 4B according to at least one example embodiment.

FIG. 5A illustrates an example structure of a write channel 102 and a write driver 134 from FIG. 1 for controlling the example circuits in FIGS. 4A and 4B. In FIG. 5A, a write channel 102 is in communication with the preamplifier 108. The write channel 102 is operable to examine precompensated (serial) write data WD and, from the precompensated write data WD, generate one or more pulses (e.g., in signal 132) that control the dynamic modulation of the bias current Ibias.

As shown in FIG. 5A, write channel 102 includes a clock generator 500, a write data pre-compensation circuit 505, a serializer 510, an encoder 515, and the MAMR pulse generator 103 from FIG. 1. The clock generator provides a clock signal at the recorded data bit rate to serializer 510 while the encoder 515 encodes write data WD into a run-length-controlled code. The serializer 510 sends the encoded write data WD to the write data pre-compensation circuit 505 according to the clock signal from the clock generator 500. The pre-compensated write data WD is sent to the preamplifier 108 as signal 130. For example, the write channel 102 delivers the precompensated write data WD to the write driver 134 on differential lines WDp/WDn.

To support dynamic STO bias control, the write channel 102 includes the MAMR pulse generator 103 that generates the MAMR trigger pulse signal 132 to have a desired pattern and delay with respect to the pre-compensated write data WD. In other words, the MAMR pulse generator 103 generates the $I_{A2}$ enabling pulses based on the precompensated write data WD. For example, the MAMR pulse generator 103 delivers the MAMR trigger pulse signal 132 via an additional channel path comprised of differential lines STOp/STOn. The delay is variable and establishes the desired relative timing between signals 130 and 132.

FIG. 5A also shows details of the write driver 134 from FIG. 1. For example, write driver 134 of the preamplifier 106 includes a driver 530 for generating the write current 138 based on the precompensated write data WD. The write current 138 is enabled to be passed to the write head 280 based on a write gate signal WG. The write driver 134 further includes the STO driver 133 from FIG. 1 (i.e., 133A or 133B from FIGS. 4A and 4B) and a logic gate 535 (e.g., an AND gate) that receives MAMR trigger pulse signal 132 and the write gate signal WG. The STO driver 133 uses the write gate signal WG as enable signal En_$\Delta$1 and the output of the logic gate 535 as enable signal En_$\Delta$2. Thus, En_$\Delta$1 is applied throughout the duration of the assertion of the write gate WG, whereas En_$\Delta$2 pulses only while write gate WG and signal 132 are both true (or activated). The STO driver 133 generates the STO control signal 140 (i.e., STO bias signal in FIG. 3) according to the enable signals En_$\Delta$1 and En_$\Delta$2 and sends the STO control signal 140 to the STO 250 to allow for microwave-assisted recording of the write data WD. The write driver 134 further includes an edge detector 540 that monitors relative timing at the output stages of the driver 530 and STO driver 133, thereby accounting for overall system timing skew. The output of the edge detector 540 is viewed through the preamplifier's 106 serial port interface (SPI). In operation, user microcode can be used to shift the timing of signals 130 and 132 until the write data WD current 138 and the STO control signal 140 edges are at a fixed delay corresponding to the write current-to-gap flux rise time in the write head 280 (i.e., the Iw to $H_{GAP}$ delay in FIG. 3). For example, the information viewed through the SPI is used to command a fixed STO time offset in MAMR pulse generator 103 from the alignment point of the edges.

Figure 5B:
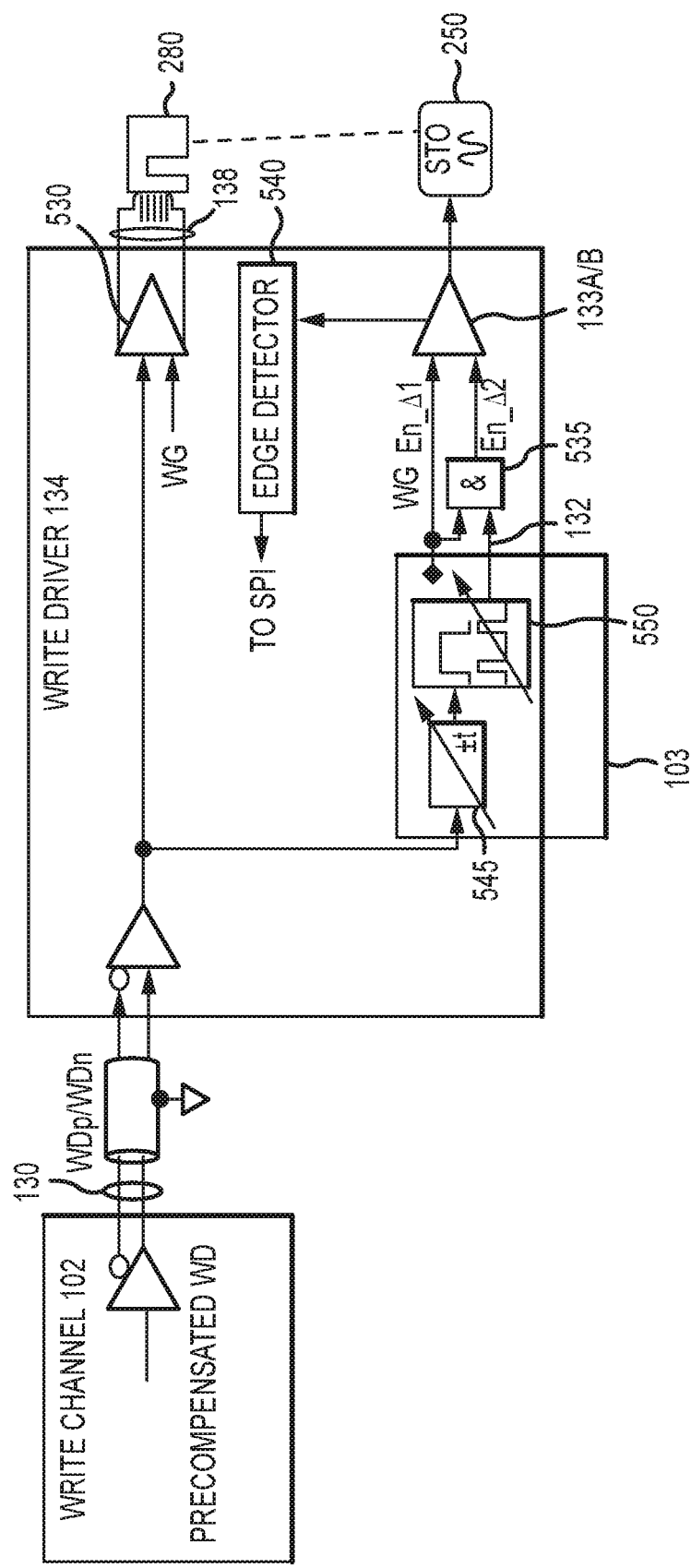

FIG. 5B shows an example structure of a write channel 102 and write driver 134 from FIG. 1 for controlling the example circuits in FIGS. 4A and 4B. FIG. 5B is an alternative structure to that shown in FIG. 5A and does not require that special MAMR-related functions be incorporated into the write channel 102. In FIG. 5B, the write channel 102 generates precompensated write data WD in the same or similar manner as that shown in FIG. 5A using elements 500, 505, and 515 (not shown for the sake of convenience). Unlike FIG. 5A, however, FIG. 5B does not use channel-to-preamplifier signaling to control the STO driver 133 and operates wholly using write data WD. In FIG.

5B, the MAMR pulse generator 103 is included in the write driver 134 instead of the write channel 102. The MAMR pulse generator 103 generates the MAMR trigger pulse signal 132 (i.e., the equivalent of signal 132 in FIG. 5A) using a delay circuit 545 offering a programmable delay relative to edges of the write data WD, followed by a programmable pulse width monostable multivibrator 550. Edges of either polarity at the output of the delay circuit 545 trigger the programmable-pulse width monostable multivibrator 550, which sets the duration of signal $I_{A2}$ within the MAMR trigger pulse signal 132.

Figure 6A:
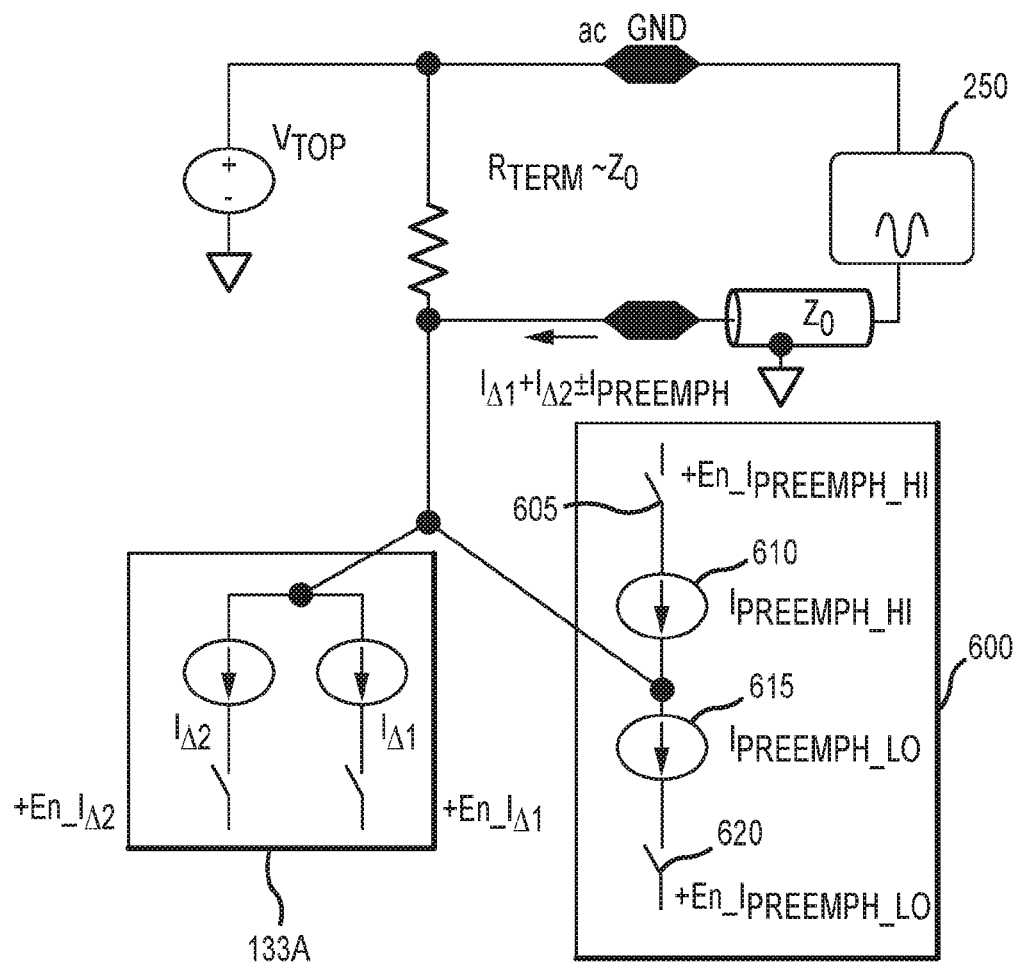
FIGS. 6A and 6B illustrate an example circuit and example timing diagram, respectively, for implementing a pre-emphasis scheme in the STO driver(s) of FIGS. 4A-5B according to at least one example embodiment.
Figure 6B:
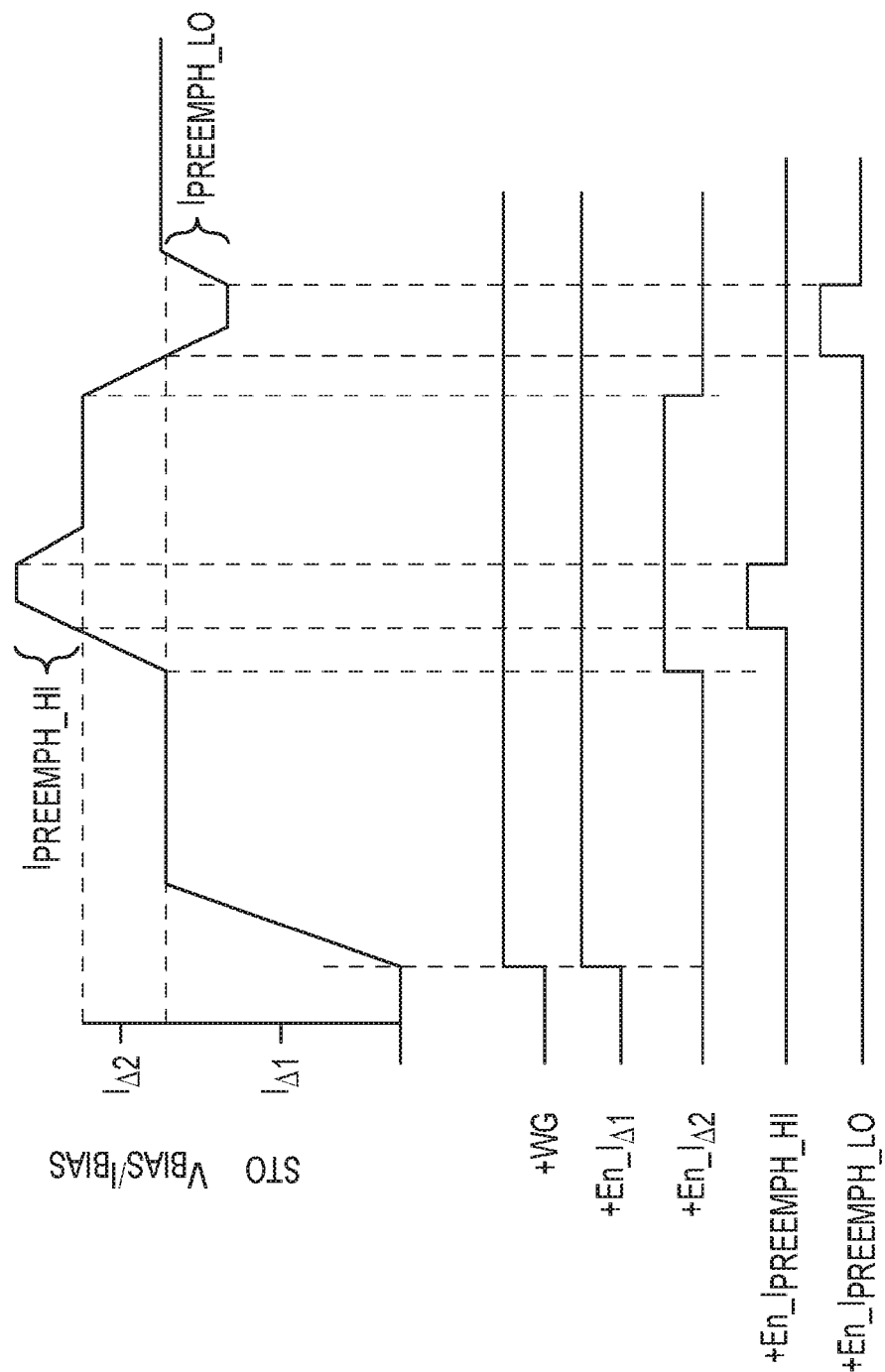

FIGS. 6A and 6B illustrate an example circuit and example timing diagram, respectively, for implementing a pre-emphasis scheme in the STO driver(s) of FIGS. 4A-5B (e.g., STO drivers 133A and/or 133B). The pre-emphasis scheme allows overshoot/undershoot and rise-time control of currents $I_{A1}$ and $I_{A2}$ and can be used to enhance STO bias rise time when low-bandwidth transmission line interconnects are employed.

FIG. 6A depicts an example circuit that includes STO driver 133A from FIG. 4A (where the details of the STO driver 133A are represented with an equivalent circuit for the sake of convenience) and a pre-emphasis circuit 600. The pre-emphasis circuit 600 includes a first enable switch 605 and a first current source 610 that is enabled and disabled by the first enable switch 605 via enable signal $EN\_I_{PREEMP\_HI}$. The pre-emphasis circuit 600 also includes a second current source 615 and a third enable switch 620 to enable and disable the second current source 615 via enable signal $EN\_I_{PREEMP\_LO}$. As illustrated in FIG. 6B, the first current source 610 may generate a current $I_{PREEMP\_HI}$ that is used to overshoot to quickly attain current $I_{A1}+I_{A2}$. The second current source 615 may generate a current $I_{PREEMP\_LO}$ that is used to undershoot to quickly return from $I_{A1}+I_{A2}$ to $I_{A1}$.

As depicted in FIGS. 6A and 6B, pre-emphasis is implemented by adding programmable amplitude/time pulses at each bias transition, in the direction of the transition. Full pre-emphasis uses bipolar driver capability. The pre-emphasis pulse amplitudes and durations can be programmable independent of the currents $I_{A1}$ and $I_{A2}$. According to one example, positive-going and negative-going pre-emphasis durations and amplitudes are the same.

As known in the art, portions of or all of the above-discussed circuits may be realized in Thevenin-equivalent form, i.e., as a voltage source driving the $R_{TERM}$ terminating resistor. In this case, the voltage source could be implemented using an upscaled-impedance version of the discussed circuits (for reduced power), followed by a complementary driver.

Rise-time programmability may be effected by segmenting the mirror transistors and activating them successively by a thermometer code generated, for example, by a step propagating down an inverter chain having controllable invertor delay; or the gates of the MOS mirror switches may be shunted by a variable capacitance. It should be understood that the implementations of FIGS. 4A, 4B and 6A are shown as single-ended circuits for ease of explanation. However, these figures may be implemented in differential form by including a complementarily-driven companion circuit of opposite polarity.

Figure 7A:
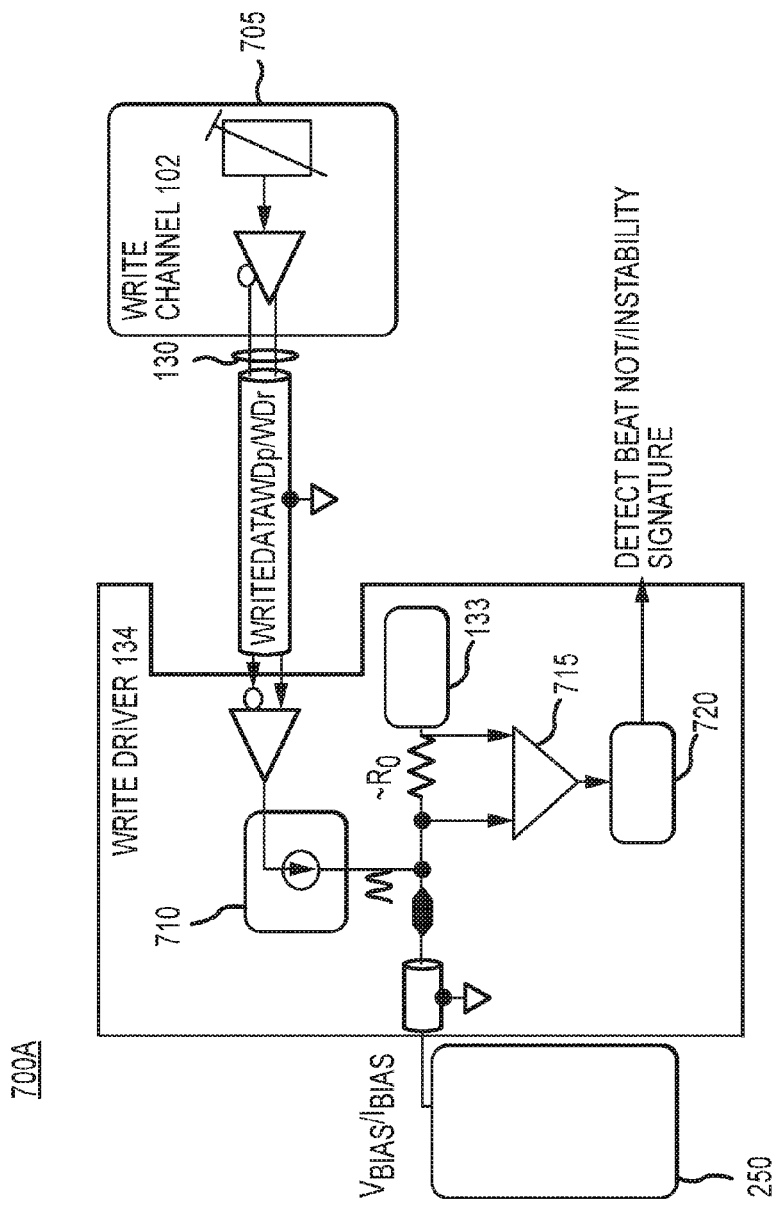
FIGS. 7A and 7B illustrate example circuits for measuring a frequency of the STO in FIG. 2B according to at least one example embodiment.
Figure 7B:
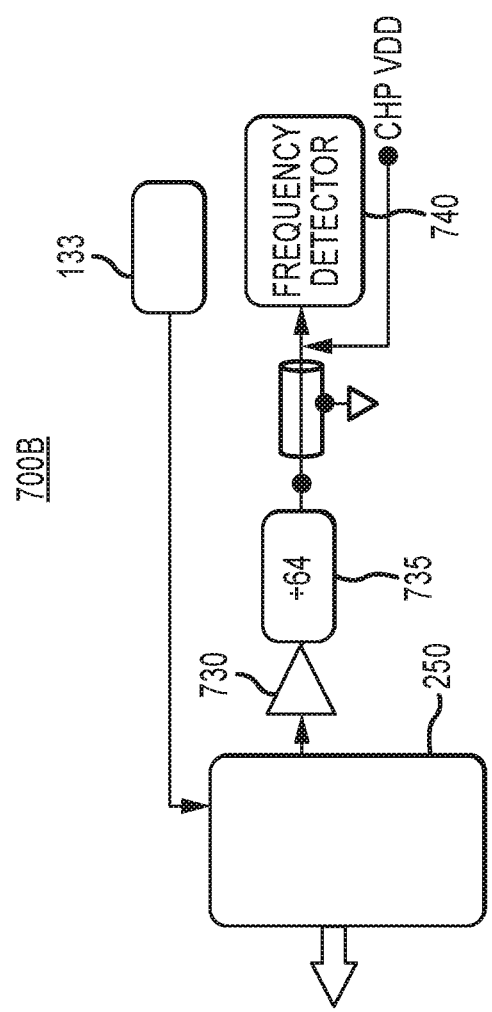

FIGS. 7A and 7B illustrate example circuits for measuring a frequency of the STO 250. Accurate knowledge of STO microwave frequency may be useful, for example, in such applications as 3D recording, where specific medium layers are writeable by different microwave frequencies.

FIG. 7A shows an example measuring circuit 700A that includes a frequency generator 705 (e.g., in the write channel 102) generating a reference frequency. The frequency generator 705 may be implemented with a phase-locked loop (PLL) circuit. The reference frequency may be a subharmonic of a desired frequency of the STO 250, where the desired frequency of the STO 250 is between about 10 GHz and 60 GHz. For example, if the desired frequency of the STO 250 is 40 GHz, then the frequency generator 705 may generate a signal with a reference frequency of 2 GHz (e.g., as a square wave). The frequency generator 705 delivers the 2 GHz tone over the write data WD signal 130 to the write driver 134. The 2 GHz tone is then superimposed on the bias line of the STO 250 by current source 710. Alternatively, the 2 GHz tone could be added to the write head current. In either case, the write current is held constant while measuring the STO frequency. Thus, measuring the frequency of the STO 250 may be considered as a type of calibration procedure.

Upon superimposing the 2 GHz tone on the bias line of the STO 250, current-sensing resistor $R_O$, amplifier 715 and filter 720 (e.g., a low pass filter) are used to detect a beat note (or frequency difference between the reference frequency and the desired frequency of the STO 250).

It should be appreciated that the write driver 134 exploits subharmonic injection locking of the STO 250. Injection locking occurs when the coupling between two oscillators (e.g., the frequency generator 705 and the STO 250) is strong enough and the frequencies are near enough that one oscillator causes the other oscillator have the same frequency. Because injection lock is obtained over a narrow range, example embodiments seek to determine the STO frequency corresponding to a specific bias point and gap-flux level. Once the frequency versus bias dependency is established, the appropriate Vbias can be set to obtain a desired STO frequency. Here, write-gap field $H_{GAP}$ is held constant, as the field is separately configured for write operations.

An injection-lock state is detected by monitoring current on the bias line of the STO 250. The following pseudo-code is performed by the interface controller 104 to construct a table (e.g., a look up table LUT) of STO frequency versus Vbias, where Vbias is the voltage applied to the STO 250 and F is the reference frequency.

```
for F = F_LOW : δF : F_HIGH begin
    F → Channel PLL;
    for VBias = V_MIN : δV : V_MAX begin
        VBias → STO Bias Driver;
        F → superpose on Bias line
        if Detect I_BIAS fluctuation begin
            Enter (VBias, F) into TABLE
        endif
    endfor
endfor
```

It should be understood that the pseudocode translates as follows. At first, a user commands a specific PLL frequency to test. Then, the STO bias (e.g., Vbias) is swept until a beat note occurs. At this point, the interface controller 104 records the commanded PLL frequency and corresponding STO bias value pair in a table. The PLL frequency is then incremented and the process repeated until all desired PLL frequencies have been covered. Thus, if N frequencies are covered, the table will have N rows, each containing an STO bias (e.g., Vbias) value required to cause the STO 250 to lock at that frequency. The interface controller 104 (e.g., via firmware) looks up/interpolates the desired STO frequency in the table to determine a corresponding Vbias/Ibias. By indexing into the table, a bias value can be computed that corresponds closely to the desired STO frequency. If unsteady STO behavior is manifest as irregular current draw on the bias line of the STO 250, STO line-broadening can be detected and flagged as a fault condition.

FIG. 7B illustrates an alternative example circuit 700B for measuring a frequency of the STO 250. FIG. 7B employs a direct measurement scheme with a high-gain limiting amplifier 730 and divider cascade 735, which may be in the form of a CMOS chip that is integrated on or bonded to a slider of the read/write assembly 120. The division ratio of the divider cascade 735 is chosen to be high enough to allow the result to be transmitted on a flexible transmission line having about a 4 GHz bandwidth. For example, the divider cascade 735 employs a division by 64 (six delay flip flops (DFFs) in a ripple divider configuration), which is sufficient. The amplifier 730 and the divider cascade 735 may be implemented on a CMOS chip. To minimize interconnects, the CMOS chip voltage supply VDD and the returned scaled-down STO frequency (scaled down by divider cascade 735) share a conductor as shown in FIG. 7B.

The frequency detector 740 detects a frequency of the output from the divider cascade 735, for example, by further division and gating/counting of a known-frequency fixed clock. If the detected frequency is determined (e.g., by the interface controller 104) to be at a level that indicates the STO 250 is operating at the desired STO frequency, then the calibration is finished. If the detected frequency is determined (e.g., by the interface controller 104) to be at a level that indicates the STO 250 is not operating at the desired STO frequency, then Vbias/Ibias is shifted higher or lower and the STO frequency re-measured. This process is performed iteratively until the desired STO frequency is achieved. A table relating STO bias (e.g., Vbias) and frequency can then be constructed as described with reference to FIG. 7A.

Alternatively, if it is desired continuously to maintain the STO frequency, the described table-driven approach may be replaced by a phase/frequency-lock oscillator (or phase locked loop (PLL)) scheme. In this case, the frequency detector 740 is implemented with a PLL circuit that continuously compares the scaled-down STO frequency signal provided by divider 735 to a fixed reference frequency (e.g., a reference frequency $f_{REF}$ generated by a reference frequency generator (not shown)). The frequency detector 740 then generates a corrective control voltage and applies the corrective control voltage to the STO driver 133 to control Vbias/Ibias. Under influence of the control voltage, STO frequency is driven to equal the reference frequency $f_{REF}$ multiplied by the division ratio of divider cascade 735. The reference frequency $f_{REF}$ may be a design parameter set based empirical evidence and/or user defined. For example, the reference frequency $f_{REF}$ may be between about 10 GHz and about 60 GHz.

Figure 8:
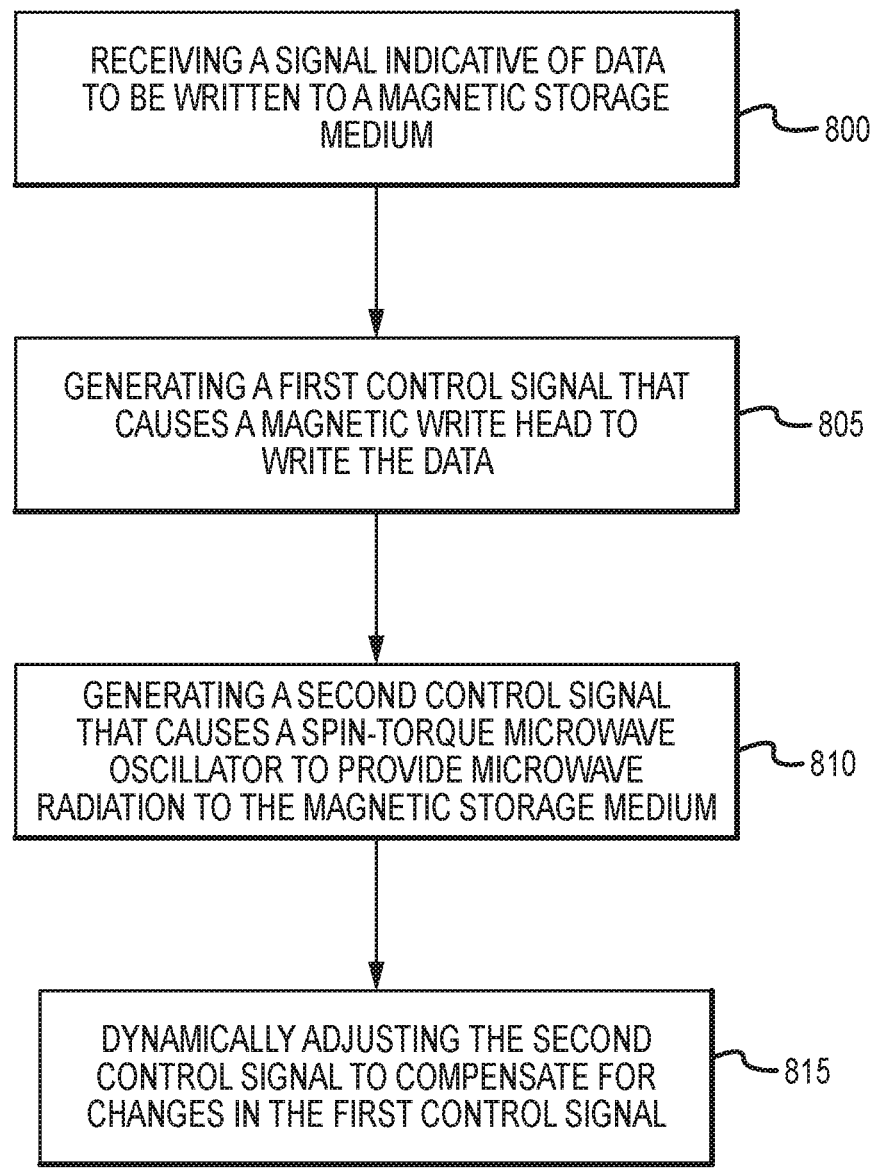
FIG. 8 illustrates example operations of the magnetic storage system 100 from FIG. 1 according to at least one example embodiment.

FIG. 8 illustrates example operations of the magnetic storage system 100 from FIG. 1. FIG. 8 is a flow diagram of a method for operating the magnetic storage system 100 described with respect to FIGS. 1-7B. While a general order for the steps of the method is shown in FIG. 8, the method can include more or fewer steps or can arrange the order of the steps differently than those shown in FIG. 8. Generally, the method starts at operation 800 and ends at operation 815. The method can be executed as a set of computer-executable instructions executed by a computer system and encoded or stored on a computer readable medium. Alternatively, the operations discussed with respect to FIG. 8 may be implemented by the various elements of the magnetic storage system 100 described with respect to FIGS. 1-7B. Hereinafter, the FIG. 8 shall be explained with reference to the systems, components, assemblies, devices, user interfaces, environments, software, etc. described in conjunction with FIGS. 1-7B.

In operation 800, the write channel 102 receives a signal (e.g., signal 124) indicative of data to be written (e.g., write data WD) to a magnetic storage medium (e.g., disk platter 116).

In operation 805, the write channel 102 generates a first control signal (e.g., signal 130) that causes a magnetic write head (e.g., write head 280) to write the data to the magnetic storage medium.

In operation 810, the write channel 102 generates a second control signal (e.g., signal 132) that causes a spin-torque microwave oscillator (e.g., STO 250) to provide microwave radiation to the magnetic storage medium (see FIG. 4A), for example, through the STO driver 133 generating signal 140. In one embodiment, the write driver 134 of the preamplifier 108 generates the second control signal 132 (see FIG. 4B). The second control signal 132 controls a bias current/voltage (e.g., Ibias/Vbias) provided to the spin-torque microwave oscillator 250.

In operation 815, the write channel 102 dynamically adjusts the second control signal 132 to compensate for changes in the first control signal 130. For example, to drive the STO 250 according to the modes of FIG. 3, the second control signal 132 is modulated to compensate for the changes in the first control signal 130. Example operations regarding the various modes are described in more detail below with respect to FIG. 9.

As discussed above with reference to FIGS. 7A and 7B, the preamplifier 108 and/or the channel 106 may measure a frequency of radiation provided by the spin-torque oscillator 250, and in response to the measured frequency of radiation, adjust the second control signal 132. The frequency of radiation provided by the spin-torque microwave oscillator 250 is measured, at least in part, by detecting a beat note or instability signature of the second control signal across a circuit element (e.g., Z0 in FIG. 7A) having a predetermined resistance and/or impedance. Alternatively, the frequency of the radiation provided by the spin-torque oscillator 250 is measured directly at the magnetic write head (see FIG. 7B). According to one embodiment, the preamplifier 108 and/or the channel 106 adjust the frequency of the radiation provided by the spin-torque oscillator 250 toward a predetermined frequency in the event that the measured frequency of the radiation is different from the predetermined frequency. The predetermined frequency may correspond to a ferromagnetic frequency of the write head 280 and/or the recording medium 260.

Figure 9:
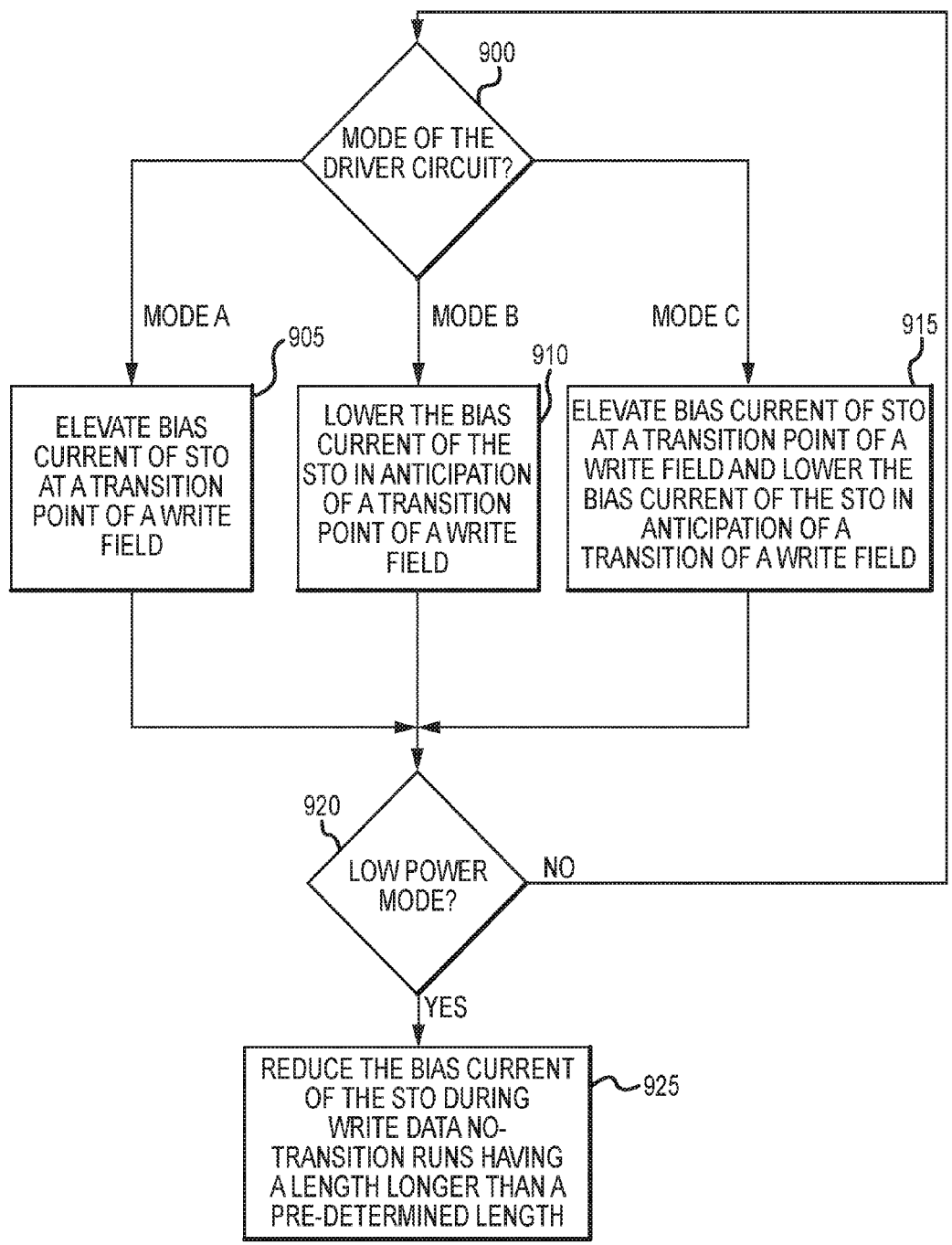
FIG. 9 illustrates example operations for driving the STO driver(s) of FIGS. 4A-5B according to the modes depicted in FIG. 3 according to at least one example embodiment.

FIG. 9 illustrates example operations for driving the STO driver of FIG. 1 according to the modes depicted in FIG. 3. The operations of FIG. 9 describe the operation 815 of FIG. 8 in further detail with reference to FIGS. 1-8. FIG. 9 is a flow diagram of a method for operating the magnetic storage system 100 described with respect to FIGS. 1-8. While a general order for the steps of the method is shown in FIG. 9, the method can include more or fewer steps or can arrange the order of the steps differently than those shown in FIG. 9. Generally, the method starts at operation 900 and ends at operation 925. The method can be executed as a set of computer-executable instructions executed by a computer system and encoded or stored on a computer readable medium. Alternatively, the operations discussed with respect to FIG. 9 may be implemented by the various elements of the magnetic storage system 100 described with respect to FIGS. 1-8. Hereinafter, the FIG. 9 shall be explained with reference to the systems, components, assemblies, devices, user interfaces, environments, software, etc. described in conjunction with FIGS. 1-8.

In operation 900, a mode of the STO driver (or driver circuit) 133 is determined. For example, the interface controller 104 receives an input from a user that indicates the mode in which the STO driver 133 should operate.

If mode A is determined, then, in operation 905, the STO driver 133 elevates (e.g., momentarily elevates) a bias current (e.g., Ibias through bias voltage Vbias) of the STO 250 at a transition point of a write field (e.g., $H_{GAP}$). Thus, it may be said that dynamically adjusting the second control signal 132 in operation 815 comprises adjusting the second control signal 132 such that a bias current Ibias of the spin-torque microwave oscillator 250 elevates at a transition point of a write current Iw controlled by the first control signal 130.

If mode B is determined, then, in operation 910, the STO driver 133 lowers (e.g., momentarily lowers) the bias current of the STO 250 in anticipation of a transition point of the write field. Thus, it may be said that dynamically adjusting the second control signal in operation 815 comprises adjusting the second control signal 132 such that a bias current Ibias of the spin-torque microwave oscillator 250 lowers in anticipation of a transition of a write current Iw controlled by the first control signal 130.

If mode C is determined, then, in operation 915, the STO driver 133 both elevates (e.g., momentarily elevates) the bias current (e.g., Ibias) of the STO 250 at a transition point of a write field (e.g., $H_{GAP}$), and lowers (e.g., momentarily lowers) the bias current of the STO 250 in anticipation of a transition point of the write field $H_{GAP}$.

In operation 920, it is determined whether the STO 250 is in a lower power mode. If so, the STO driver 133 reduces the bias current during write data WD transition runs having a length longer than a pre-determined length in operation 925. The pre-determined length may be a design parameter set based on empirical evidence and/or user input. If it is determined that the STO 250 is not in a low power mode, then the method returns to operation 900. In other words, it may be said that dynamically adjusting the second control signal 132 in operation 815 comprises adjusting the second control signal 132 such that a bias current Ibias of the spin-torque microwave oscillator 250 reduces during instances where the first control signal 132 is determined to be applying a write data no-transition run that has a length longer than a predetermined length.

In view of the foregoing description, it should be appreciated that example embodiments provide improved devices and methods for controlling the amplitude/phase of an STO in the context of MAMR so that recording of data may be quickly achieved with low power consumption.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An apparatus for microwave-assisted magnetic recording, the apparatus comprising:
   a magnetic write head operable to write data to a magnetic storage medium;
   a spin-torque microwave oscillator coupled to the magnetic write head and operable to provide microwave radiation to the magnetic storage medium; and
   a driver circuit in communication with the magnetic write head, the driver circuit operable to dynamically modulate bias current provided to the spin-torque microwave oscillator in sympathy with data being written to the magnetic storage medium by the magnetic write head,
   wherein the driver circuit reduces the bias current provided to the spin-torque microwave oscillator during write data no-transition runs having a length longer than a predetermined length.

2. The apparatus of claim 1, wherein the driver circuit momentarily elevates the bias current provided to the spin-torque microwave oscillator at a transition point of a write field applied by the magnetic write head.

3. The apparatus of claim 1, wherein the driver circuit momentarily lowers the bias current provided to the spin-torque microwave oscillator in anticipation of a transition of a write field applied by the magnetic write head.

4. The apparatus of claim 1, wherein the driver circuit both: (i) momentarily elevates the bias current provided to the spin-torque microwave oscillator at a transition point of a write field applied by the magnetic write head and (ii) momentarily lowers the bias current provided to the spin-torque microwave oscillator in anticipation of a transition of a write field applied by the magnetic write head.

5. The apparatus of claim 1, further comprising:
   a preamplifier in communication with both the magnetic write head and the spin-torque microwave oscillator, wherein the preamplifier comprises the driver circuit.

6. The apparatus of claim 5, further comprising:
   a write channel in communication with the preamplifier, wherein the write channel is operable to examine precompensated write data and, from the precompensated write data, generate one or more pulses that control the dynamic modulation of the bias current.

7. The apparatus of claim 5, wherein the preamplifier is further operable to measure a frequency of the radiation provided by the spin-torque oscillator and to adjust the frequency of the radiation provided by the spin-torque oscillator toward a predetermined frequency in the event that the measured frequency of the radiation is different from the predetermined frequency.

8. The apparatus of claim 7, wherein the frequency of the radiation provided by the spin-torque oscillator is measured by detecting a beat note or instability signature of the bias current measured across a circuit element having a predetermined resistance.

9. The apparatus of claim 7, wherein the frequency of the radiation provided by the spin-torque oscillator is measured directly at the magnetic write head.

10. A method for recording data, the method comprising:
    receiving a signal indicative of data to be written to a magnetic storage medium;
    generating a first control signal that causes a magnetic write head to write the data to the magnetic storage medium;

generating a second control signal that causes a spin-torque microwave oscillator to provide microwave radiation to the magnetic storage medium;

dynamically adjusting the second control signal to compensate for changes in the first control signal;

measuring a frequency of radiation provided by the spin-torque microwave oscillator; and in response to the measured frequency of radiation, adjusting the second control signal.

11. The method of claim 10, wherein the second control signal controls a bias current provided to the spin-torque microwave oscillator and wherein the second control signal is modulated to compensate for the changes in the first control signal.

12. The method of claim 10, wherein dynamically adjusting the second control signal comprises adjusting the second control signal such that a bias current of the spin-torque microwave oscillator elevates at a transition point of a write current controlled by the first control signal.

13. The method of claim 10, wherein dynamically adjusting the second control signal comprises adjusting the second control signal such that a bias current of the spin-torque microwave oscillator lowers in anticipation of a transition of a write current controlled by the first control signal.

14. The method of claim 10, wherein dynamically adjusting the second control signal comprises adjusting the second control signal such that a bias current of the spin-torque microwave oscillator reduces during instances where the first control signal is determined to be applying a write data no-transition run that has a length longer than a predetermined length.

15. The method of claim 10, wherein the frequency of radiation provided by the spin-torque oscillator is measured, at least in part, by detecting a beat note or instability signature of a bias current provided to the spin-torque microwave oscillator across a circuit element having a predetermined resistance or impedance.

16. A magnetic recording system, comprising:
a write channel;
a preamplifier receiving a signal from the write channel that is indicative of data to be written to a magnetic recording medium;
a write head that generates a magnetic field based on a first driver signal received from the preamplifier, the magnetic field causing the data to be written to the magnetic recording medium; and
an oscillator that generates microwave radiation based on a second driver signal received from the preamplifier, the second driver signal being dynamically modulated in sympathy with the first driver signal,
wherein the oscillator comprises a spin-torque microwave oscillator,
wherein the second driver signal comprises a bias current provided to the spin-torque microwave oscillator, and
wherein the preamplifier is operable to dynamically modulate the second driver signal by performing one or more of the following operations:
(i) elevating the bias current provided to the spin-torque microwave oscillator at a transition point of a write field applied by the write head;
(ii) lowering the bias current provided to the spin-torque microwave oscillator in anticipation of a transition of the write field applied by the write head;
(iii) reducing the bias current provided to the spin-torque microwave oscillator during write data no-transition runs having a length longer than a predetermined length; and
(iv) adjusting the bias current to cause the spin-torque oscillator to change a frequency of the radiation generated thereby toward a determined frequency.

17. The system of claim 16, wherein the write channel is operable to examine precompensated write data and, from the precompensated write data, generate one or more pulses for the second driver signal that controls the dynamic modulation of the bias current.

18. The system of claim 16, wherein the preamplifier is further operable to measure the frequency of the radiation provided by the spin-torque oscillator.

19. The system of claim 18, wherein the frequency of the radiation provided by the spin-torque oscillator is measured by detecting a beat note or instability signature of the bias current measured across a circuit element having a predetermined resistance.

20. The system of claim 18, wherein the frequency of the radiation provided by the spin-torque oscillator is measured directly at the magnetic write head.

* * * * *